(No Model.) 3 Sheets—Sheet 1.
G. D. PETTINGELL.
AIR BRAKE AND STEAM PIPE COUPLING.
No. 597,220. Patented Jan. 11, 1898.
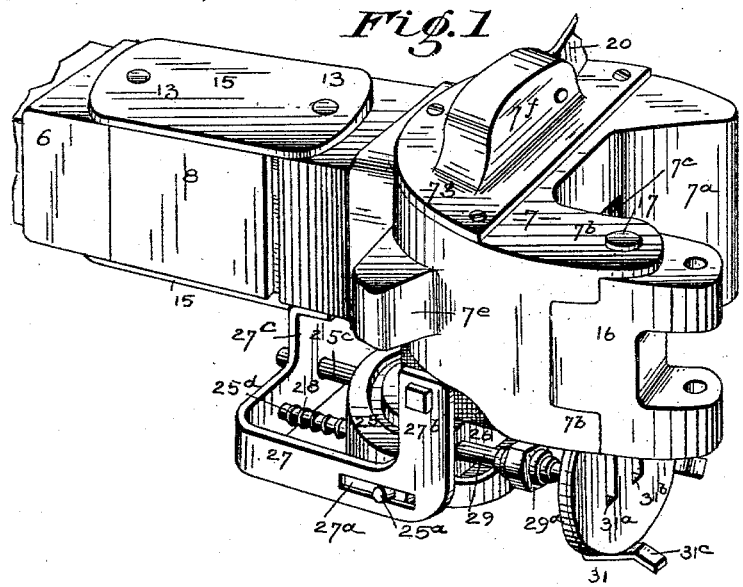
Fig. 1
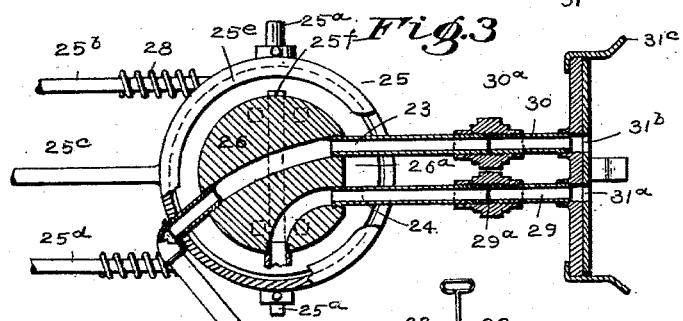
Fig. 3
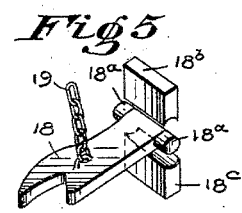
Fig. 5
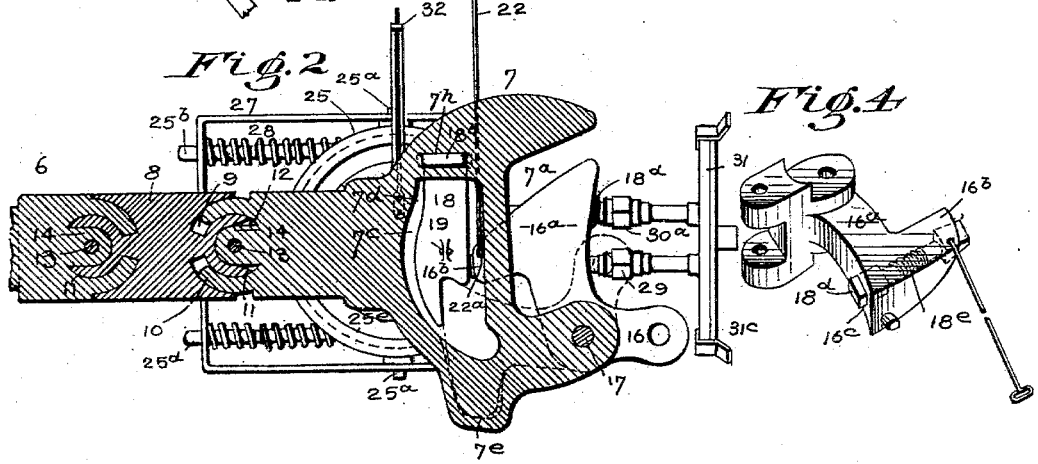
Fig. 2
Fig. 4
Witnesses:—
W. H. Rowe
B. Krupp
Inventor:
George D. Pettingell
By his Atty.
O. B. Reichell (No Model.) 3 Sheets—Sheet 2.
G. D. PETTINGELL.
AIR BRAKE AND STEAM PIPE COUPLING.
No. 597,220. Patented Jan. 11, 1898.
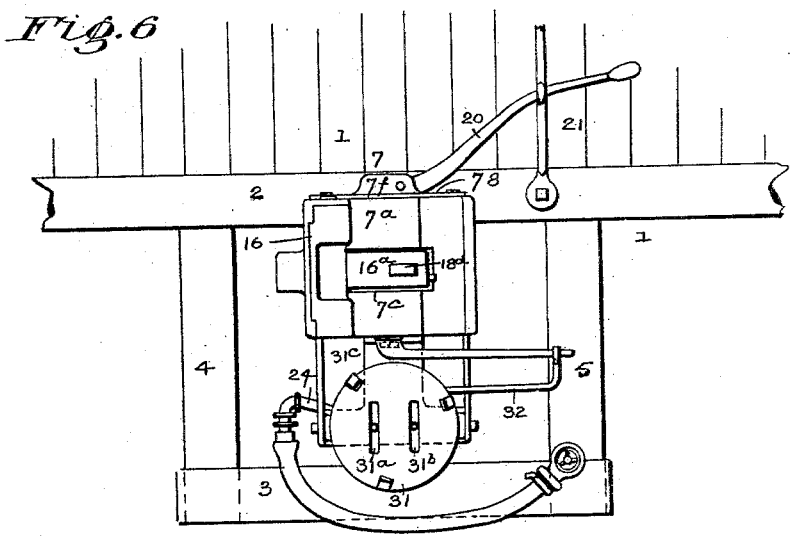
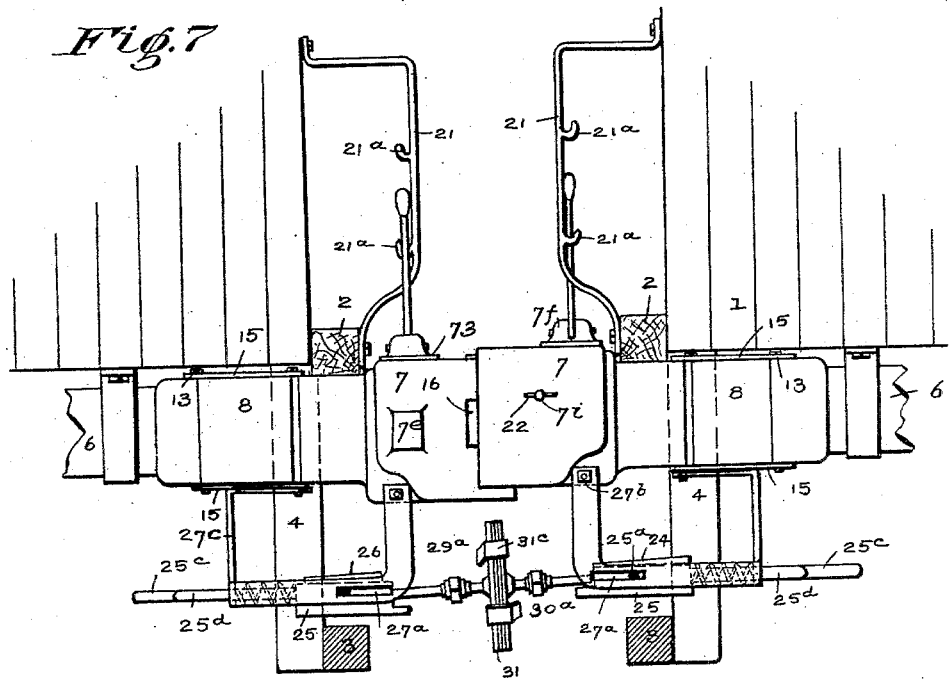
Witnesses:-
W. H. Rowe,
B. Knupfer
Inventor
George D. Pettingell
By his Atty
O. B. Reichel (No Model.) 3 Sheets—Sheet 3.

G. D. PETTINGELL.
AIR BRAKE AND STEAM PIPE COUPLING.

No. 597,220. Patented Jan. 11, 1898.

Witnesses:—
W. H. Rowe
B. Knupe

Inventor
George D. Pettingell
By his Atty. O. B. Reichell

THE NORRIS PETERS CO., PHOTO-LITHO., WASHINGTON, D. C.

UNITED STATES PATENT OFFICE.

GEORGE D. PETTINGELL, OF JEFFERSON, IOWA.

AIR-BRAKE AND STEAM-PIPE COUPLING.

SPECIFICATION forming part of Letters Patent No. 597,220, dated January 11, 1898.

Application filed July 6, 1897. Serial No. 643,502. (No model.)

*To all whom it may concern:*

Be it known that I, GEORGE D. PETTINGELL, a citizen of the United States, residing at Jefferson, in the county of Greene and State of Iowa, have invented certain new and useful Improvements in Car Air-Brake and Steam-Pipe Couplings, of which the following is a specification.

My invention relates, first, to improvements in devices for coupling the draw-bars and also for simultaneously coupling the air and steam pipes of railroad-cars.

The object of my invention is, first, to improve the construction of car-couplings to render the automatic draw-bar coupling positive, easy of action, and secure and to hold the knuckle securely in both its locked and its unlocked position and prevent its being held or thrown in a half-way position at any time when the two cars come together.

A further object of my invention is to make the parts of the said coupling-head in such manner that they may be easily taken apart, put together, and replaced when broken.

A further object of my invention is to form the coupling-head connection with the draw-bar in such manner that the cars may readily turn curves or be coupled on short curves when required to do so.

A further object of my invention is to connect the draw-bar coupling automatically and also connect automatically the several air and steam pipes which connect the air-brakes and which heat and ventilate the cars; also, to provide improved means for supporting and connecting said devices with the draw-bar coupling to admit of the most complete flexibility of said connections and to insure a close union one with the other under all conditions.

The invention consists in the construction and novel combination and arrangement of parts hereinafter fully described, illustrated in the accompanying drawings, and pointed out in the claims.

Figure 8:
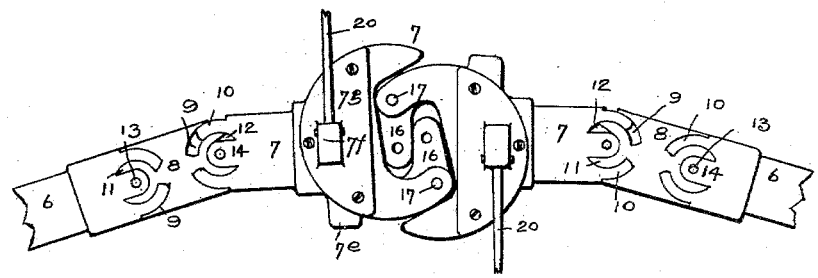
Figure 9:
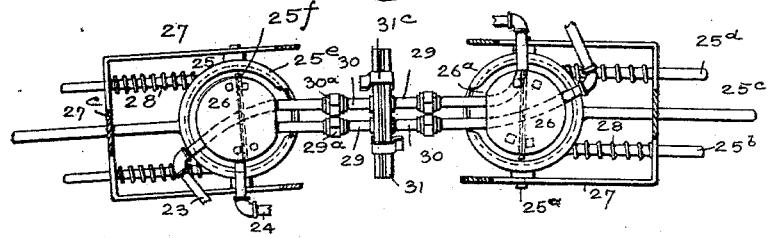
Figure 10:
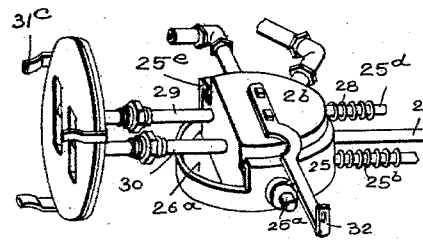
Figure 11:
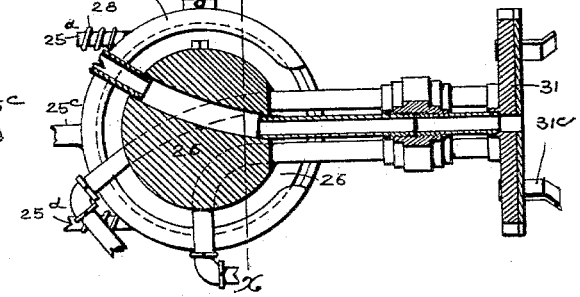
Figure 12:

In the drawings, Figure 1 is a perspective view of one of my coupling-heads complete. Fig. 2 is a horizontal section through the draw-head of my draw-bar coupling; Fig. 3, a similar sectional plan of the air and steam pipe coupling; Fig. 4, a perspective view in detail of the knuckle in reverse position to that shown in Fig. 2; Fig. 5, a perspective view of the locking-dog with its bearing-blocks detached; Fig. 6, a front elevation of the coupler complete; Fig. 7, a side elevation thereof with the lower frame cross-bars in section; Fig. 8, a plan of my improved coupling connecting two cars on a curve; Fig. 9, a sectional plan of the air and steam pipe coupling connections in the same position as in Fig. 8; Fig. 10, a perspective view of one of the air and steam pipe coupling sections; Fig. 11, a sectional plan similar to Fig. 3, the air and steam pipe coupling with three pipe connections; and Fig. 12, a section in line $x\,x$ of Fig. 11, looking rearwardly.

The frame 1 of the car carries the draw-bar in the usual manner, and the coupling connections are supported to play between the horizontal frame-pieces 2 and 3 and the vertical frame-pieces 4 and 5, properly joined together.

The draw-bar 6 is connected to the coupling-head 7 by a flexible link-section 8, which latter comprises at each end segmental mortises 9, which receive corresponding tenons 10 of the draw-bar and coupling-head, which extend from top to bottom thereof, the said link-sections 8 also having segmental tenons 11, which fit truly in corresponding mortises 12 in the adjacent ends of the draw-bar and the coupling-head. The ends of coupling-head and draw-bar each have central hubs 14 to receive pins 13, which also pass through plates 15, secured thereby to the top and bottom, respectively, of the said parts. This construction will admit of a flexible and very secure connection between the coupling-head and draw-bar and allow the draw-bars of two cars to be easily connected together and adapt themselves either to a straight or a curved line. The coupling-head 7 has the usual vertical recess $7^a$ at the front, to one side of which is pivoted a knuckle 16 by means of a vertical pin 17, which passes through lugs $7^b$ thereof, and also has a horizontal recess $7^c$ to receive the blade $16^a$ of the knuckle and a transverse vertical recess $7^d$ to receive a locking-dog 18, pivotally supported therein to vibrate in a vertical plane and lock either behind or in front of the blade $16^a$ of the knuckle to hold the latter either in its open or in its closed position. A chamber $7^e$ upon one side of the coupling-head is adapted to receive the heel $16^b$ of the knuckle-blade $16^a$ when the knuckles of the two cars are engaged with each other, and a chamber $7^f$ in the top of a cover-plate $7^g$, fitted upon the coupling-head, receives a chain 19, connected to the dog 18 and also the end of a lever 20, connected to the chain for lifting the said dog when the knuckles are to be uncoupled, the lever 20 being held at its free end by a bracket 21, suitable lugs $21^a$ upon the bracket serving to hold the said lever either in its raised or its lowered position.

The locking-dog 18 has pins $18^a$ at one end, which are held in recesses at the front and back, respectively, of a vertical recess $7^h$, and blocks $18^b$ and $18^c$ are also held in said vertical recess, respectively, above and below the said pins $18^a$ and pivotal end of the locking-dog to support the latter securely and allow it to swing freely within the recess $7^d$ of the coupling-head. A rod 22, having a pin $22^a$ at its inner end, passes through a lateral aperture $7^i$ of the coupling-head and rests upon the floor of the horizontal recess $7^c$ and is connected by said pin to the heel $16^b$ of the knuckle-blade and provides means for pushing the knuckle open if at any time it should be closed when uncoupled. The heel $16^b$ of the knuckle-blade is held to abut against the dog to hold the knuckle open, and the latter is first lifted until it rests upon the inclined or wedge-shaped upper face of said blade by means of a trigger $18^d$, which passes from the face to the heel of said blade through a suitable aperture $16^c$ therein and is kept normally withdrawn within said aperture by a coiled spring $18^e$, which encircles the shank of said trigger and presses against an abutment-wall of said recess. When the cars come together, the knuckle of the connecting car pushes first against the outwardly-projecting end of the trigger $18^d$ and presses its inner wedge-shaped end beneath the dog 18 and lifts it sufficiently to allow the point of the knuckle-blade to pass beneath the said dog and lift it farther and completely out of the way by means of its inclined wedge-shaped upper surface.

The air-pipe 23 and steam-pipe 24 of the coupling are supported in a coupling-box comprising a cup-section 25 and a port-block section 26, held within the cup, each being supported as hereinafter described, the cup-section to both oscillate and reciprocate and the port-block section to both rock and oscillate independently of each other. The cup-section 25 has laterally and oppositely disposed pivot-lugs $25^a$, which fit and are held in horizontal slots $27^a$ in bracket-plates 27, secured to the coupling-head by bolts $27^b$, the said cup-section being thus free to oscillate horizontally and also to reciprocate within said slot. The cup-sections 25 also have guide-rods $25^b$ $25^c$ $25^d$, each of which passes through a hole in the vertical plate $27^c$ of the bracket 27, which serve to hold said sections to reciprocate truly in a horizontal plane to receive the coupling blow of the cars when they come together, suitable springs 28, placed upon the outer guide-rods $25^b$ $25^c$, serving to normally hold the coupling-sections pressed outwardly.

The cup-section 25 has a top rim-flange $25^e$, which encircles the sides and back thereof and covers a bottom flange $26^a$ of the port-section 26 to hold it within the cup-section and allow it to oscillate freely therein, and a bridge-flange $25^f$ is located diametrically upon the bottom of said cup-section, upon which the said port-section may rock within the cup-section. The port-section is connected by pipes 29 30, leading from the ports therein, to a coupling-disk 31, which latter has slotted ports $31^a$ $31^b$ for the passage of the air and steam from the pipes 29 30 to similar ports and pipes of the car to be connected therewith. The coupling-disks 31 are provided with guide-prongs $31^c$, which flare outwardly and cause said disks to come together and conform one to the other, and the pipes 29 and 30 each have coupling-joints $29^a$ and $30^a$, which allow the disks to be easily separated from the port-block and pipe-coupling connections, but also admit of the adjustment of the faces of the disks to bring them squarely together.

The pipe-coupling connections are free to swing and adjust themselves independently of the draw-bar coupling when so required, but are normally held in line therewith by a bracket-arm 32, slotted at its outer end and secured at its inner end to the top of the port-block section and by a spring-steel blade fitted at its outer and free end within the outer slot of arm 32, and secured at its inner end to the under side of the draw-head.

The separate operation of the several details have been heretofore described and a general statement only is deemed necessary in connection herewith. Cars are made ready to couple by placing the free end of the lever below the lug of the guide-bracket, thus to allow the dog to drop to its working position. Should the knuckle be thrown into its locked position, it must be first pulled out by the lateral rod. The cars are then ready to come together, and the outwardly-projecting section of the knuckle of one coupling will press against the blade of the other coupling and also upon the trigger therein, which latter will first slightly lift the dog until it rests upon the inclined upper surface of the said blade, the movement of the latter being continued until the dog drops securely behind the heel of the knuckle and locks it securely, with its outer joint held transversely across the coupling-head and in engagement with the other knuckle. When the cars are to be uncoupled, the lever is drawn down and the dog lifted from behind the heel of the knuckle-blade, thus allowing the coupling-heads to be pulled apart. While the draw-bar couplings are being connected the disks upon the ends of the air and steam pipe connections will come together, the oscillating and teetering blocks and cups allowing them to adjust themselves regardless of any ordinary inequality of height or axial position. The spring connections of the cup-sections press the disks outwardly with sufficient force to cause them to be held together with sufficient force to form an air and steam tight joint between the disks, the faces of which are suitably packed with sheet-rubber to make the joint secure.

The port-blocks are connected by suitable pipes with the ordinary Westinghouse or other air-brake, air-pipe, and steam-pipe connections, and it is evident that a third pipe to carry air for ventilation or other purposes may be connected with the port-block and pipe-coupling sections, as shown in Fig. 11 of the drawings. The connecting-pipes of any ordinary steam or air brake system may be connected with the coupling, the ordinary stop-cocks therein serving to turn on the air and steam after the cars have been coupled.

I claim as my invention and desire to secure by Letters Patent—

1. A car-coupling comprising a fixed head an oscillating vertically-pivoted knuckle having a blade extension and a horizontally-pivoted locking-dog supported in said head tangentially to the arc of movement of the knuckle-blade and adapted to oscillate vertically and transversely within the head to hold the knuckle open until automatically coupled, substantially as described.

2. A car-coupling comprising a vertically-pivoted hook, a horizontally-pivoted locking-dog supported in said head, a lifting-pin fitted in said hook to slide thereon and lift the dog from behind the coupling-hook, substantially as described.

3. A car-coupling comprising a coupling-head having a horizontal recess, a vertical transverse recess and a vertical longitudinal recess all connected together, a knuckle-joint pivoted to one of the side jaws of the coupling-head, a dog pivotally supported to oscillate vertically and transversely therein, bearing-blocks adapted to fit the vertical longitudinal recesses and support the pivotal end of the dog and a cap-plate to cover the coupling-head and recesses therein, substantially as described.

4. A car-coupling comprising a coupling-head having a transverse recess therein, a knuckle pivoted to said head, a dog pivoted thereto to swing vertically within said lateral recess, a cap-plate bolted to said coupling-head to cover said recess and providing an extension of the chamber therein above the said dog and a lever and link pivoted to and adapted to swing within said cap-chamber and chamber extension, substantially as described.

5. In a car-coupling the combination with the coupling-head of the draw-head, each having segmental recesses in the abutting ends thereof, a coupling-link also having recesses and segment-sections to engage with the corresponding recesses and sections of the coupling-head and draw-bar and pins connecting said sections, substantially as described.

6. A pipe-coupling for railroad-cars, comprising a cup-section, a port-section oscillating therein, a plurality of pipes leading from the port-section, a disk and pipe leading therefrom and pipe-couplings connecting the pipe of the disk with the pipes of the port-section, substantially as described.

7. A combined draw-bar and air-pipe coupling comprising a draw-bar coupling-head, an air-pipe coupling comprising oscillatory cup and port-block sections, a pipe leading therefrom to a coupling-disk, a bracket and a spring-plate connecting the coupling-head of the draw-bar with the oscillatory pipe connections, substantially as described.

8. A car-coupling pipe connection, comprising an oscillatory port and block section pipes leading therefrom, a coupling-disk, a cup-section into which the said port-section is fitted, guide-rods projecting rearwardly therefrom, a bracket and springs embracing the guide-rods to press outwardly upon the coupling-disks, substantially as described.

9. In a pipe-coupling for railroad-cars, the combination with the bracket having horizontal guide-slots, cup-section having lateral pivot projections to engage therewith and guide-rods supported horizontally by said brackets, springs encircling said rods, a port-section held to oscillate within said cup-section, a pipe leading therefrom and a coupling-disk secured thereto, substantially as described.

10. In a pipe-coupling for railroad-cars the combination with the bracket of the oscillatory and reciprocating cup-section having a diametrically-arranged bridge-lug upon the bottom thereof, a port-section held within said cup-section having a pipe and coupling-disk thereon and adapted to both oscillate and rock within said cup-section, substantially as described.

In testimony that I claim the foregoing as my invention I have signed my name in the presence of two subscribing witnesses.

GEORGE D. PETTINGELL.

Witnesses:
WM. H. ROWE,
M. A. CARROLL.